US008036678B2

(12) United States Patent
Goldenberg et al.

(10) Patent No.: US 8,036,678 B2
(45) Date of Patent: *Oct. 11, 2011

(54) REAL-TIME GEOGRAPHIC INFORMATION SYSTEM AND METHOD

(75) Inventors: Sharon Goldenberg, Binyamina (IL); Ofer Solomon, Maalot (IL); Igal Sroka, Bikat Beit Hakarem (IL); Ofer Zilberstein, Hod Hasharon (IL); Menachem Dvir, Kiryat Motzkin (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 1363 days.

This patent is subject to a terminal disclaimer.

(21) Appl. No.: 11/459,939

(22) Filed: Jul. 26, 2006

(65) Prior Publication Data
US 2007/0027591 A1    Feb. 1, 2007

(30) Foreign Application Priority Data
Jul. 27, 2005  (IL) .......................................... 169934

(51) Int. Cl.
*H04W 24/00*       (2009.01)
(52) U.S. Cl. ...................... 455/456.1; 345/633; 345/165; 345/2.3; 707/724; 701/23; 701/24; 701/210; 701/28; 701/40; 455/457; 455/566
(58) Field of Classification Search .................... 701/23, 701/24, 210, 28, 40; 455/456.1, 457, 566; 707/724; 345/633, 15, 2.36
See application file for complete search history.

(56) References Cited

U.S. PATENT DOCUMENTS

| 5,557,397 | A  | 9/1996  | Hyde et al.    |
| 6,281,970 | B1 | 8/2001  | Williams et al.|
| 6,307,556 | B1 | 10/2001 | Ellenby et al. |
| 6,522,312 | B2 | 2/2003  | Ohshima et al. |

(Continued)

FOREIGN PATENT DOCUMENTS
DE      102004061842        7/2005
(Continued)

OTHER PUBLICATIONS

Shared Database of Annotation Information for Wearable Augmented Reality System Koji Makita ,Masayuki Kanbara, and Naokazu Yokoya Graduated School of Information Science,Nara Institute of Science and Technology, 8916-5 Takayama,Ikoma,nara,630-0192 Japan pp. 464-471.

(Continued)

*Primary Examiner* — Kamran Afshar
*Assistant Examiner* — Khalid Shaheed
(74) *Attorney, Agent, or Firm* — Mark M. Friedman

(57) ABSTRACT

An information system for dynamic distribution of location-related information between users with different perspective views includes a number of user units each including a viewing arrangement defining a viewing direction and a registration subsystem for deriving a mapping between the current perspective view and a shared location reference. The user units also include a data management system and a wireless communication arrangement. At least one of the user units further includes a user input interface for designating a viewed location within the current perspective view for association with location-related information to generate a new location-related information entry for sharing with others of the plurality of user units. At least one other of the user units further includes a display device associated with the viewing arrangement for displaying location-related information correctly positioned in the context of the current perspective view.

19 Claims, 11 Drawing Sheets

U.S. PATENT DOCUMENTS

| | | | |
|---|---|---|---|
| 6,587,601 B1* | 7/2003 | Hsu et al. ..................... 382/294 |
| 6,879,835 B2 | 4/2005 | Greene et al. |
| 7,046,214 B2 | 5/2006 | Ebersole, Jr. et al. |
| 7,127,348 B2 | 10/2006 | Smitherman et al. |
| 7,136,059 B2 | 11/2006 | Kraus et al. |
| 7,174,031 B2* | 2/2007 | Rhoads et al. ............... 382/107 |
| 7,180,476 B1 | 2/2007 | Guell et al. |
| 7,363,157 B1 | 4/2008 | Hanna et al. |
| 7,365,544 B2 | 4/2008 | McCracken et al. |
| 2002/0196202 A1 | 12/2002 | Bastian |
| 2002/0196248 A1* | 12/2002 | Kraus et al. .................. 345/419 |
| 2005/0008256 A1* | 1/2005 | Uchiyama et al. ............ 382/291 |
| 2005/0215267 A1* | 9/2005 | Cartmell ..................... 455/456.1 |
| 2006/0244820 A1* | 11/2006 | Morita et al. ............. 348/14.13 |
| 2009/0097710 A1* | 4/2009 | Sroka et al. .................. 382/103 |
| 2009/0289957 A1* | 11/2009 | Sroka et al. .................. 345/634 |
| 2009/0326604 A1* | 12/2009 | Tyler et al. ..................... 607/45 |

FOREIGN PATENT DOCUMENTS

| | | |
|---|---|---|
| EP | WO2005064440 | 7/2005 |
| IL | 111069 | 9/1994 |

OTHER PUBLICATIONS

Environmental Media: Accessing Virtual Representation of Real-Time Sensor Data and Site-Specific Annotations Embedded in Physical Environments by: Scott S. Fisher Keio University at Shonan Fujisawa, Japan.

Design and Implementation of a Mobile Device for Outdoor Augmented Reality in the Archeoguide Project Tim Gleue, Patrick Dahne, Computer Graphics Center Rundeturinsstrasse 642.83 Darmstadt Germany. "Undated downloaded from the Internet May 5, 2005".

Implementing an Augumented Scene Delivery System James E. Mower Department of Geography and Planning University at Albany, Albany NY 12222 USA "Undated downloaded from the internet May 5, 2005".

Augmented Reality for Visitors of Cultural Heritage Sites Didier Stricker, John Kargiannis, Ioaniss T. Christou,Tim Gleue, Nikos Ioannidis, "Undated downloaded from the Internet May 5, 2005".

* cited by examiner

REAL-TIME GEOGRAPHIC INFORMATION SYSTEM AND METHOD

FIELD AND BACKGROUND OF THE INVENTION

The present invention relates to geographic information system and, in particular, it concerns a system and method for dynamic distribution of location-related information between users with different perspective views, and for providing location-related information based on a wide-area geographical database.

The developing field of technology known as "augmented reality" relates to systems which supplement a view of the real world with additional visual information. This technology has potential applications in a wide range of contexts, for example, ranging from industrial production to tourist information systems and to games. Of particular relevance to the present invention is the context of information systems where a system provides a user with geographic information related to various objects or locations which he or she is viewing.

One example of an augmented reality information system is prototype system under development as part of a project entitled "Augmented Reality-based Cultural Heritage On-site Guide" or "ARCHEOGUIDE" funded under a European Union "Information Society Technologies" (IST) project. The system is intended to give users touring cultural heritage sites a three-dimensional display of reconstructed sites as an overlay to the directly observed ruined site. The system also provides audio-visual presentations related to objects being viewed by the user. Registration of the user's position and direction of regard are achieved by a two stage process including gross tracking by GPS and compass measurements followed by fine alignment by registration of images from a head-mounted camera with pre-calibrated images taken from different viewpoints around the site.

Although the Archeoguide system potentially offers a significant step towards a useful outdoor geographic information system, it suffers from a number of severe limitations. Firstly, the need to provide an extensive set of pre-calibrated reference images covering the site from many different viewing angles is very limiting. While such an approach may be feasible for highly localized applications such as cultural heritage sites, it cannot form a basis for vide area systems where the task of setting up a large number of pre-calibrated reference images giving full coverage of a large area from multiple viewpoints would quickly become prohibitive.

A further limitation of the Archeoguide system is the inability to convey updated or transient location-related information, or other dynamic information, between users. Since the information displayed is based on a predefined information databases, there is no convenient manner for two different users viewing the same region to relay location-related information to each other.

In the field of geographical surveys and cartography, there exist extensive geographical databases which store various geographical information tied to geostationary coordinates. Such databases may include a wide range of information regarding natural and manmade features such as hydro-topology (e.g., rivers, streams, underground water sources and aquifers), vegetation, manmade infrastructure (e.g. roads, electricity cables, water, gas and oil pipelines etc.), buildings and other geographical information. Such databases often also include information about the physical topography of the landscape in the form of a digital terrain model (DTM) and/or digital surface model (DSM), and aerial or satellite photographs, or "orthophotos", which are tied to the geographic coordinate system at reference points. Such databases may provide partial or complete coverage extending over areas of many miles, for example extending over an entire urban area, natural park or other region of interest. In some cases, databases of this type encompass an entire state or country. Such databases have not previously been used as a basis for augmented reality applications or other information systems where information is presented in the context of video images or a direct view of the terrain.

There is therefore a need for a geographic information system which would allow distribution of location-related information between users with different perspective views. It would also be advantageous to provide a geographic information system which would operate on the basis of existing geographic information databases, thereby facilitating wide-area use of the system without extensive dedicated infrastructure.

SUMMARY OF THE INVENTION

The present invention is a system and method for dynamic distribution of location-related information between users with different perspective views, and for providing location-related information based on a wide-area geographical database.

According to the teachings of the present invention there is provided, an information system for dynamic distribution of location-related information between users with different perspective views, the system comprising a plurality of user units, each user unit including: (a) a viewing arrangement defining a viewing direction of a current perspective view; (b) a registration subsystem for deriving a mapping between the current perspective view and a shared location reference; (c) a data management system including a processor and a storage device, the data management system storing location-related information associated with coordinates within the shared location reference and employing the mapping to transfer between the coordinates within the shared location reference and a corresponding viewed location within the current perspective view; and (d) a wireless communication arrangement for sharing between the plurality of user units location-related information and corresponding coordinates, wherein at least a first of the user units further includes a user input interface for designating a view location within the current perspective view for association with location-related information, thereby generating a new location-related information entry for sharing with others of the plurality of user units, and wherein at least a second of the user units further includes a display device associated with the viewing arrangement for displaying location-related information correctly positioned in the context of the current perspective view.

According to a further feature of the present invention, each of the plurality of user units includes the display device associated with the viewing arrangement.

According to a further feature of the present invention, each of the plurality of user units includes the user input interface such that a user of each of the user units can designate a viewed location for display with location-related information in the current perspective view of users of all others of the user units.

According to a further feature of the present invention, the viewing arrangement includes an image sensor generating video images for display on the display device, a position of the image sensor the current perspective view.

According to a further feature of the present invention, the display device is a see-through display device, the viewing arrangement allowing direct viewing of the current perspective view through the display device by a user.

According to a further feature of the present invention, the viewing arrangement further includes an optical arrangement for magnifying the current perspective view as directly viewed by the user.

According to a further feature of the present invention, each of the user units includes an image sensor deployed in fixed spatial relation to the viewing arrangement, and wherein the shared location reference includes at least one location reference image, the registration subsystem being configured to determine a registration mapping between images from the image sensor and the shared location reference image.

According to a further feature of the present invention, the at least one location reference image is one of the group made up of: an aerial image; a satellite image; and an orthophoto.

According to a further feature of the present invention, the location reference further includes at least one of an elevation map and a digital surface model.

According to a further feature of the present invention, the at least one location reference image includes a plurality of reference images, and wherein the first of the user units generates a new location-related information entry including coordinates of the designated location within one of the reference images and an index identifying the corresponding one of the reference images.

According to a further feature of the present invention, each of the user units is a mobile unit.

There is also provided according to the teachings of the present invention, a method for dynamic distribution of location-related information between two users viewing a common region of interest from different viewing directions, each user having a current perspective view of the region of interest, the method comprising: (a) for each user: (i) providing a shared location reference for the region of interest, the shared location reference having a defined coordinate system, and (ii) deriving a mapping between the current perspective view of the user and the shared location reference; (b) inputting from the first user a designation input designating a location within the first user's current perspective view as a point-of-interest location; (c) processing the designation input, by use of the first user's mapping, to derive coordinates in the shared location reference corresponding to the point-of-interest location; (d) processing the coordinates, by use of the second user's mapping, to derive a location of the coordinates within the second user's perspective view; and (e) indicating the point-of-interest location to the second user via a display in the context of the second user's current perspective view.

According to a further feature of the present invention, the shared location reference includes at least one shared reference image, the deriving a mapping being performed by correlating the shared reference image with the current perspective view of each user as derived from an image sensor.

According to a further feature of the present invention, the correlating includes: (a) correlating the current perspective view with an intermediate reference image so as to generate a first mapping transformation; and (b) correlating the intermediate reference image with the shared reference image so as to genie rate a second mapping transformation.

According to a further feature of the present invention, the processing the designation input is performed using a processing system at a first location, and wherein the processing the coordinates is performed using a processing system at a second location, the method further comprising transmitting the coordinates from the first location to a second location.

According to a further feature of the present invention, the shared location reference includes a plurality of shared reference images, and wherein the transmitting includes transmitting an identifier for identifying one of the shared reference images within which the coordinates lie.

According to a further feature of the present invention, the transmitting is performed wirelessly.

According to a further feature of the present invention, the transmitting includes transmitting a location-related information associated with the point-of-interest location.

According to a further feature of the present invention, the coordinate system is a geographical coordinate system.

According to a further feature of the present invention, the indicating is performed by generating a visible indication on a transparent display positioned in alignment with the second user's current perspective view as viewed directly by the second user.

According to a further feature of the present invention, the indicating is performed by generating a visible indication on a display screen in the context of an image of the second user's current, perspective view as derived from an image sensor.

According to a further feature of the present invention, in a case where the location of the coordinates lies outside the second user's perspective view, a direction of angular displacement of the second user's perspective view required to bring the location within the perspective view is indicated on the display.

There is also provided according to the teachings of the present invention, an information system for displaying location-related information to a user, the system comprising: (a) a viewing arrangement including an image sensor for sensing images of a scene, the viewing arrangement defining a viewing direction of a current perspective view in defined spatial relation to the image sensor; (b) a location reference source providing at least one location reference image selected from the group made up of: an aerial image; a satellite image; and an orthophoto; (c) a registration subsystem associated with the image sensor and the location reference source, the registration subsystem being configured to determine a registration mapping between the images from the image sensor and the location reference image, thereby deriving a mapping between the current perspective view and the location reference image; (d) a data management system including a processor and a storage device, the data management system storing location-related information associated with coordinates within the location reference image and employing the mapping to transform between the coordinates within the location reference image and a corresponding viewed location within the current perspective view; and (e) a display device associated with the viewing arrangement for displaying location-related information correctly positioned in the context of the current perspective view.

According to a further feature of the present invention, each of the location reference images is tied to a system of geographic coordinates.

According to a further feature of the present invention the location reference source further provides at least one of an elevation map and a digital surface model.

According to a further feature of the present invention, at least the viewing arrangement, the location reference source, the data management system and the display device are implemented as part of a mobile unit.

According to a further feature of the present inventions the mobile unit further includes a wireless communication arrangement for sharing location-related information and corresponding coordinates with other similar mobile units.

According to a further feature of the present invention, the location reference source includes a remote database storing a plurality of the location reference images and a wireless communication arrangement for transferring a selected one of the plurality of location reference images to the mobile unit.

According to a further feature of the present invention, the viewing arrangement is configured to display a video image derived from the image sensor on the display device.

According to a further feature of the present invention, the display device is a see-through display device, the viewing arrangement allowing direct viewing of the current perspective view through the display device by a user.

According to a further feature of the present invention, the viewing arrangement further includes an optical arrangement for magnifying the current perspective view as directly viewed by the user.

There is also provided according to the teachings of the present invention, a method for displaying location-related information to a user having a current perspective view of a region of interest, the method comprising: (a) providing at least one location reference image for the region of interest, the location reference image being tied to a defined coordinate system and being selected from the group made up of: an aerial image; a satellite image; and an orthophoto; (b) employing an image sensor to sense images of a scene spatially related to the current perspective view of the user; (c) determining a registration mapping between the images from the image sensor and the location reference image, thereby deriving a mapping between the current perspective view of the user and the location reference image; (d) obtaining coordinates in the location reference image corresponding to a point-of-interest location; (e) processing the coordinates by use of the mapping to derive a location of the coordinates within the perspective view; and (f) indicating the point-of-interest location to the user via a display in the context of the user's current perspective view.

According to a further feature of the present invention, the determining a registration mapping includes: (a) correlating the images from the image sensor with an intermediate reference so as to generate a first mapping transformation; and (b) correlating the intermediate reference image with the location reference image so as to generate a second mapping transformation.

According, to a further feature of the present invention, the at least one location reference image is provided via wireless communications from a remote data source.

According to a further feature of the present invention, the obtaining coordinates is performed via wireless communications from a remote data source.

According to a further feature of the present invention, the defined coordinate system is a geographical coordinate system.

According to a further feature of the present invention, the indicating is performed by generating a visible indication on a transparent display positioned in alignment with the user's current perspective view as viewed directly by the user.

According to a further feature of the present invention, the indicating is performed by generating a visible indication on a display screen in the context of an image of the user's current perspective view as derived from the image sensor.

According to a further feature of the present invention, in a case where the location of the coordinates lies outside the perspective view, a direction of angular displacement of the perspective view required to bring the location within the perspective view is indicated on the display.

BRIEF DESCRIPTION OF THE DRAWINGS

The invention is herein described, by way example only, with reference to the accompanying drawings, wherein:

FIGS. 2A-2C are the view seen by uses of the three mobile units of FIG. 1 wherein FIG. 2A illustrates the view of a user designating a point of interest and FIGS. 2B and 2C illustrate the resultant information displayed to users of the other two mobile units;

DESCRIPTION OF THE PREFERRED EMBODIMENTS

The present invention is a system and method for dynamic distribution of location-related information between users with different perspective views, and for providing location-related information based on a wide-area geographical database.

The principles and operation of systems and methods according to the present invention may be better understood with reference to the drawings and the accompanying description.

By way of introduction, the present invention has two distinct aspects which will be described herein, each of which is believed to be patentable in its own right, and which may be used together to particular advantage. According to a first aspect of the invention, a user with a first perspective view can designate a point of interest within his perspective view which will then be displayed correctly positioned in the context of a different perspective view of a second user. This allows dynamic transfer of information between users for updating existing information in an underlying database or for communicating transient information. According to a second aspect of the invention, a geographic information system providing an augmented reality type interface is implemented with a registration subsystem based at least in part on image registration between an image sensor of the user unit and aerial, satellite or orthophoto images of a geographical database. This approach renders it possible to implement augmented reality type interfaces over large continuous areas on a scale which has not hitherto been feasible.

The present invention will be described below in the context of a non-limiting example as a guide system for a safari. It should be clearly understood that the invention is not limited to such systems and is equally applicable to a wide range of applications including, but not limited to: walking tours, helicopter tours and other tourist systems of all types; spectator sporting events; inspection and maintenance of infrastructure and industrial installations; surveying; route planning and navigation; and any and all additional civilian and military applications.

Figure 1:
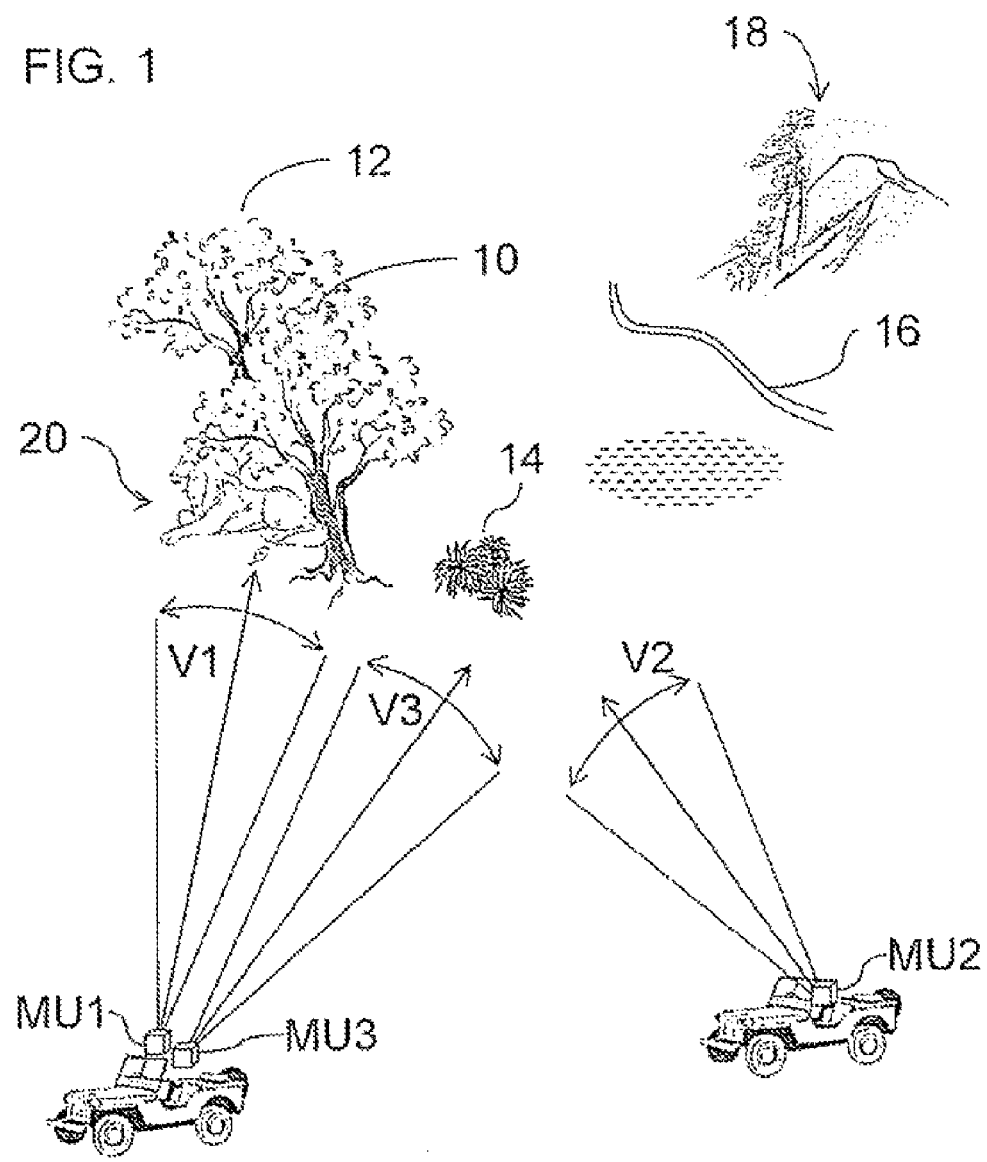
FIG. 1 is a schematic illustration of an information system, constructed and operative according to the teachings of the present invention, including three mobile units.

Referring now to the drawings, FIGS. 1 and 2A-2C illustrate in intuitive terms the underlying concept of the first aspect of the present invention. Thus, FIG. 1 illustrates a situation where three users, each provided with a mobile unit MU1, MU2 and MU3, respectively, constructed and operative according to the teachings of the present invention, are moving past or through a region of interest. In the present non-limiting example, the region of interest is a safari which includes various short range objects such as trees 10, 12, and a shrub 14, as well as various longer range objects such as a river 16 and a mountain 18. Each use or at least each mobile unit in the case that the units are shared (as will be discussed below) has his own viewing direction illustrated as V1, V2 and V3, respectively.

Figure 2C:
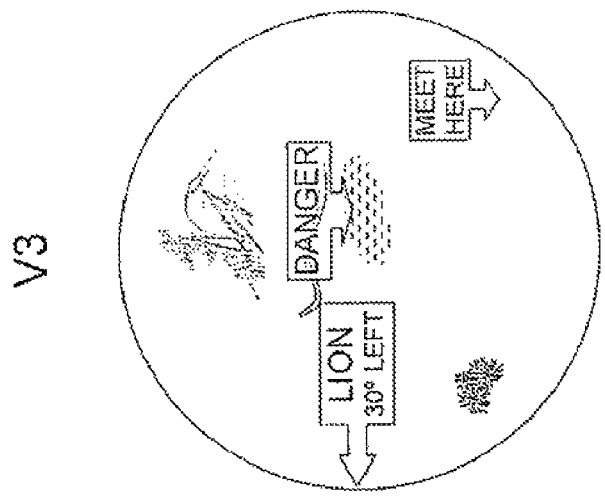
Figure 2B:
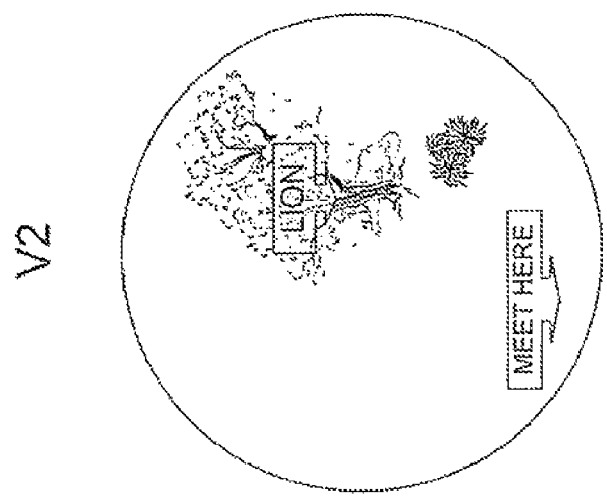
Figure 2A:
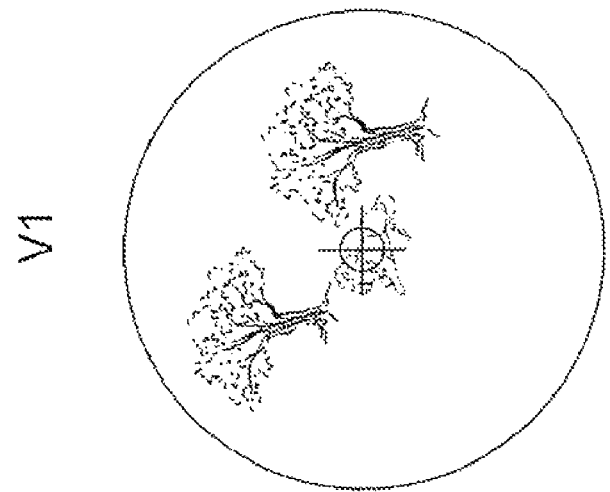

In this case, the user of mobile unit MU1 has recently spotted a lion 20 resting close to trees 10, 12 and wishes to alert the other users to its presence. Since the lion is a transient feature, it clearly does not appear in the preexisting geographical database available to the users. According to the prior art, the user of mobile unit MU1 would have no better option than to try to describe orally to the other users where to look. In contrast, the present invention allows the user of mobile unit MU1 to designate the position of the lion 20 in his current perspective view V1 as a point of interest, thereby creating a corresponding data entry defined in terms of a shared location reference. The lion can then immediately be highlighted in another user's view V2 as illustrated in FIG. 2B. Optionally, even if the lion lies outside the current field of view, the system can assist in navigation or deflection of the viewing direction to bring the lion into view, as illustrated in V3.

In order to provide this functionality, the present invention preferably provides an information system including a plurality of user units MU1, MU2 and MU3, wherein each user unit includes: a viewing arrangement defining a viewing direction of a current perspective view; a registration subsystem for deriving a mapping between the current perspective view and a shared location reference; a data management system storing location-related information associated with coordinates within the shared location reference and employing the mapping to transform between the coordinates within the shared location reference and a corresponding viewed location within the current perspective view; and a wireless communication arrangement for communication with other user units or a remote base station. For designating a point of interest, at least one of the user units includes a user input interface for designating a viewed location within the current perspective view for association with location-related information, thereby generating a new location-related information entry for sharing with others of the plurality of user units. In order to view location-related information, at least one of the user units includes a display device associated with the viewing arrangement for displaying location-related information correctly positioned in the content of the current perspective view.

It will immediately be appreciated that this aspect of the present invention provides profound advantages over conventional information systems based on predefined database content. Specifically, by allowing one or more user to designate points of interest which then appear correctly positioned for each user within his or her personal perspective view, the information system of the present invention becomes a dynamic tool for users in different locations and/or with different viewing directions to communicate instantly and unambiguously about scenes they are looking at. This and other advantages of the present invention will become clearer from the following detailed description.

Before addressing features of the invention in more detail, it will be useful to define certain terminology as used herein in the description and claims. Firstly, reference is made to a "location reference", and particularly a "shared location reference" which forms the basis for a common language between the user units. In its broadest sense, the "location reference" can be any reference information which can be used to define an absolute or relative system of coordinates against which the current perspective view geometry can be compared. Thus, examples include, but are not limited to, a coordinate system, a map, and one or more reference image. In certain preferred implementations to be discussed below, the location reference is chosen to allow image correlation and/or feature matching techniques with an image captured from the user unit to derive a mapping between the current perspective view and the location reference. For this purpose, the location reference is typically either a three dimensional model or a two-dimensional or three-dimensional photographic representation of the region of interest. In most preferred implementations, the location reference includes one or more reference image chosen from an aerial image; a satellite image; and an orthophoto. The location reference also preferably includes an elevation map, such as a DTM.

The term "orthophoto" is used to refer to a photographic representation of a geographical region which has been generated so as to give an effective viewing direction which is orthogonal (i.e., vertical) at all points. Techniques for generating orthophotos and DTMs from a plurality of aerial or satellite photographs are well known, and extensive databases of orthophotos and DTMs are available from various sources.

It should be noted that the shared location reference need not be stored in its entirety, or at all, at each user unit. Particularly for wide area applications, the size of the geographical database may prohibit storage of the entire database at each user unit, particularly for mobile implementations. Instead, reference data may be dynamically downloaded to the user unit on the basis of current location and/or direction of travel. Alternatively, at least part of the processing may be performed at a remote base station where the database resides and at least part of the processing may be performed at the base station with the results transmitted to the user unit. This approach is particularly useful in a two-stage correlation approach as will be described below with reference to FIG. 13.

The word "perspective" is used herein to refer to any non-orthogonal viewing direction. When two views are described as "different perspective views", it is implied that the have non-coincident viewing directions.

Reference is made herein to deriving a "mapping" between a current perspective view and a location reference. In a simple case, this mapping may be a two-dimensional transformation such as an affine transformation. For more robust and precise operation, the mapping preferably employs three-dimensional information where available (such as a DTM) to derive a mapping between objects or regions visible in the perspective view and corresponding elements in the location reference.

The term "point of interest" is used herein to refer to any location which has been designated for association with location-related information. The "location-related information" may be merely a flag indicating that this location has been designated, or may include additional information such as the identity or nature of the point and what is located there, who designated it and when, what type or "layer" of information the point belongs to etc. The "location related information" and the "point of interest" may be of only a transient nature (e.g., the position of a lion as mentioned above), and may relate to virtual and/or subjective information such as designation of an arbitrary meeting place or indicating a "look here,!" trace.

Finally with respect to terminology reference is made to "wireless communication" between the user units. It should be noted that this communication may be either direct or indirect, and may in fact occur entirely via a remote base station. The communication itself may be according to any conventional wireless communication arrangement such as via a wireless network, cellular communication system or satellite communication system. The choice between these options depends primarily on the range of distances to be covered and the extent of the communications infrastructure available in the region of interest.

Figure 3:
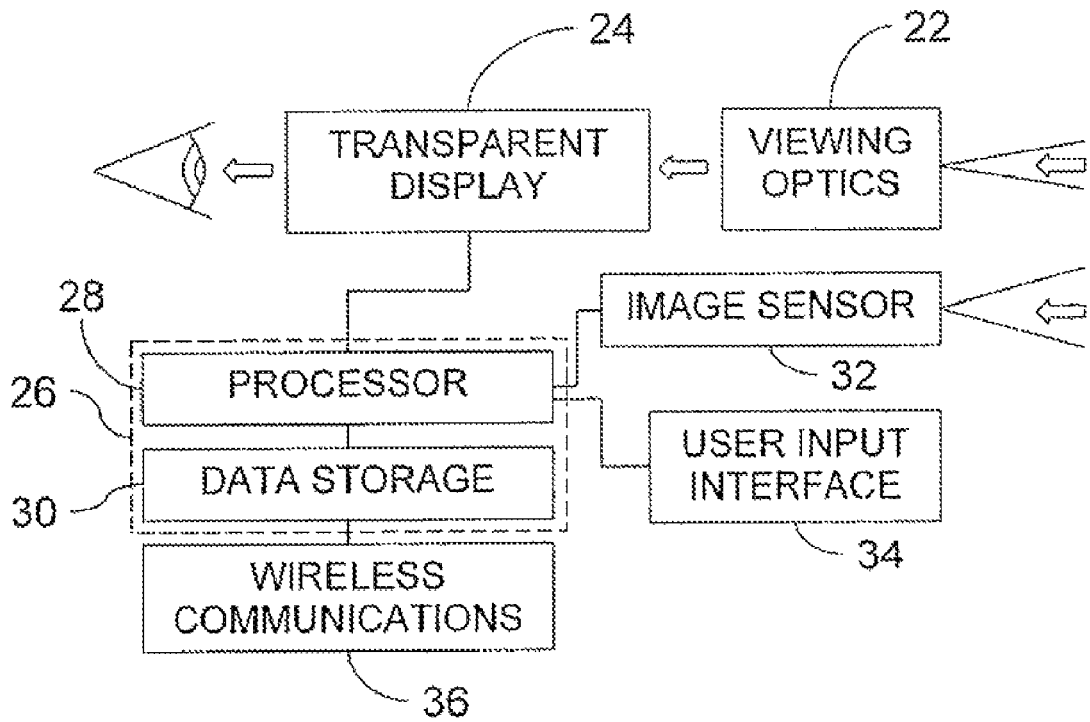
FIG. 3 is a block diagram of a first preferred embodiment of a mobile unit for use in the system of FIG. 1.
Figure 4:
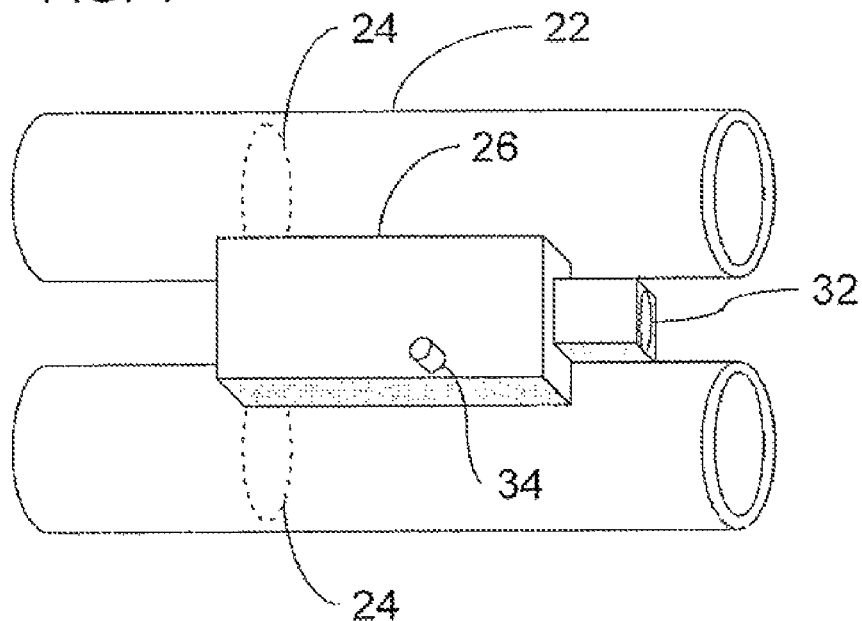
FIG. 4 is a schematic isometric view of a possible implementation of the mobile unit of FIG. 3.

Turning now to the features of the invention in more detail, two examples of implementations of a user unit will now be described with reference to FIGS. 3-5 and FIGS. 6 and 7, respectively. Turning first to FIGS. 3 and 4, these show a mobile implementation of a user unit wherein the viewing arrangement allows for direct viewing of the region of interest. "Direct viewing" in this context refers to a case where light from the scene viewed reaches the eye of user either directly or via an optical arrangement. Thus, the user unit illustrated here includes viewing optics 22 through which the user looks and which therefore define the perspective view of the user. For applications in which the viewed objects are typically at a distance, optics 22 may include a telescopic magnification arrangement, such as the binoculars implementation shown in FIG. 4 for magnifying the current perspective view. In order to display information to the user in the context of the directly viewed perspective view, a see-through (transparent) display device 24 is deployed to superimpose images visible to the user over the directly viewed scene. Various see-through display technologies offering monochrome or color displays are well known in the fields of augmented reality displays, mobile computing displays and helmet mounted displays. One particularly preferred but non-limiting example of suitable technology for implementing such a display is commercially available from Lumus Vision Ltd. of Rehovot, Israel.

A computer system 26, including at least one processor 28 and at least one data storage device 30, performs the various functions of registration, data management, communications and display output. For the purpose of achieving registration between the current perspective view and the location reference, the embodiment shown preferably includes an image sensor 32 deployed in known, and typically fixed, spatial relation (relative angle and orientation) to optics 22. Image sensor 32 may be any desired type of staring image sensor sensitive to any desired wavelength of light including, but not limited to, visible frequencies and infrared.

Figure 5:
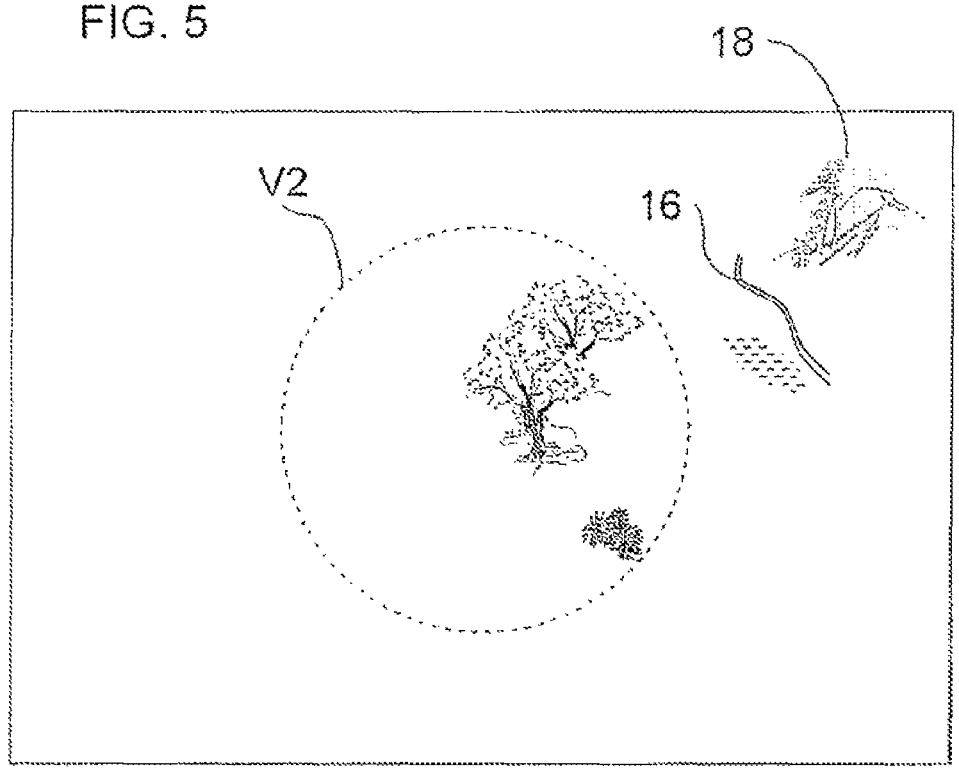
FIG. 5 is a schematic representation of the relative fields of view of an optical arrangement and an image sensor from the implementation of FIG. 4.

Although the viewing direction of the image sensor 32 does not necessarily need to be coinicident with the viewing direction of the perspective view defined by optics 22, a parallel-optical-axis implementation is typically preferred. The field of view of image sensor 32 and optics 22 is not necessarily the same. Particularly where magnifying optics is employed to give a relatively narrow magnified field of view, it may typically be advantageous to employ an image sensor with a wider field of view in order to provide a larger amount of data for image correlation processing. By way of a non-limiting example, FIG. 5 illustrates a possible relation between the user's field of view V2 as defined by the user optics and the image sensor field of view as defined by image sensor 32 for mobile unit MU2. As shown here, the wider image sensor field of view often includes various distant geographical features such as river 16 and mountain 18 which are not currently of interest to the user but are particularly helpful in the image correlation location registration process.

For designation of a point of interest, at least one of the user units and preferably all are provided with a user input interface 34. In the particularly simple implementation of FIG. 4, user input interface 34 is implemented simply as a push-button which designates the location currently appearing at the center of the user's perspective view as a point of interest. Even with such a simple interface, addition of another toggle control (not shown) may allow choice between a number of types of points of interest to be designated. If more extensive information is to be associated with the point, an external data input device such as a touch screen or small wireless keyboard may be added. Finally, a wireless communication arrangement 36 is provided for communication with other user units and/or a base station.

Figure 6:
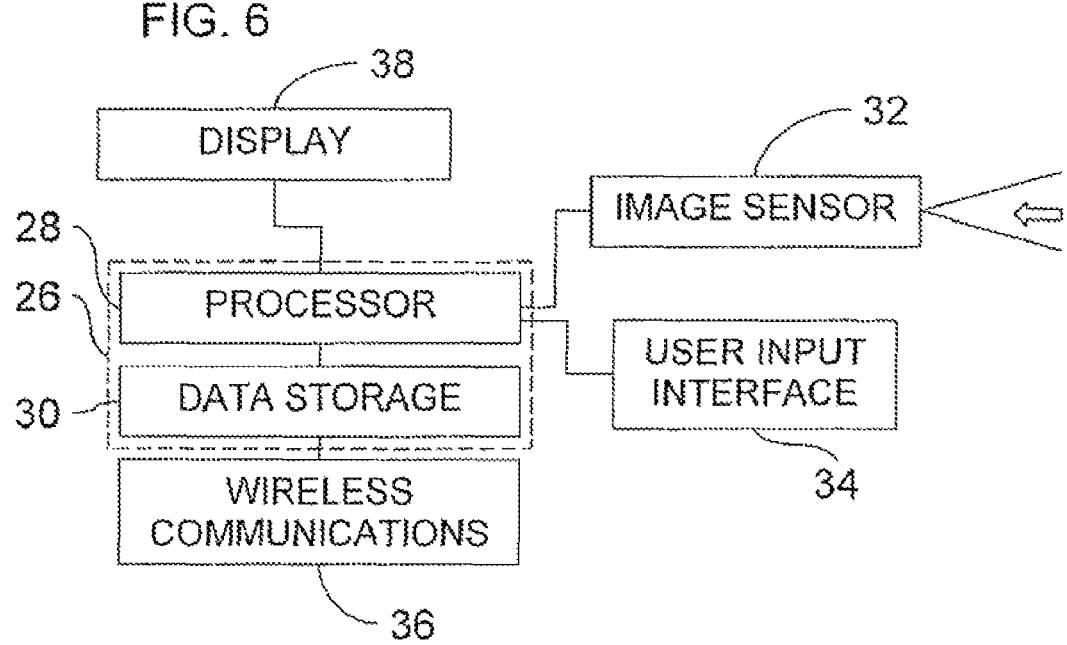
FIG. 6 is a block diagram of a second preferred embodiment of a mobile unit for use in the system of FIG. 1.
Figure 7:
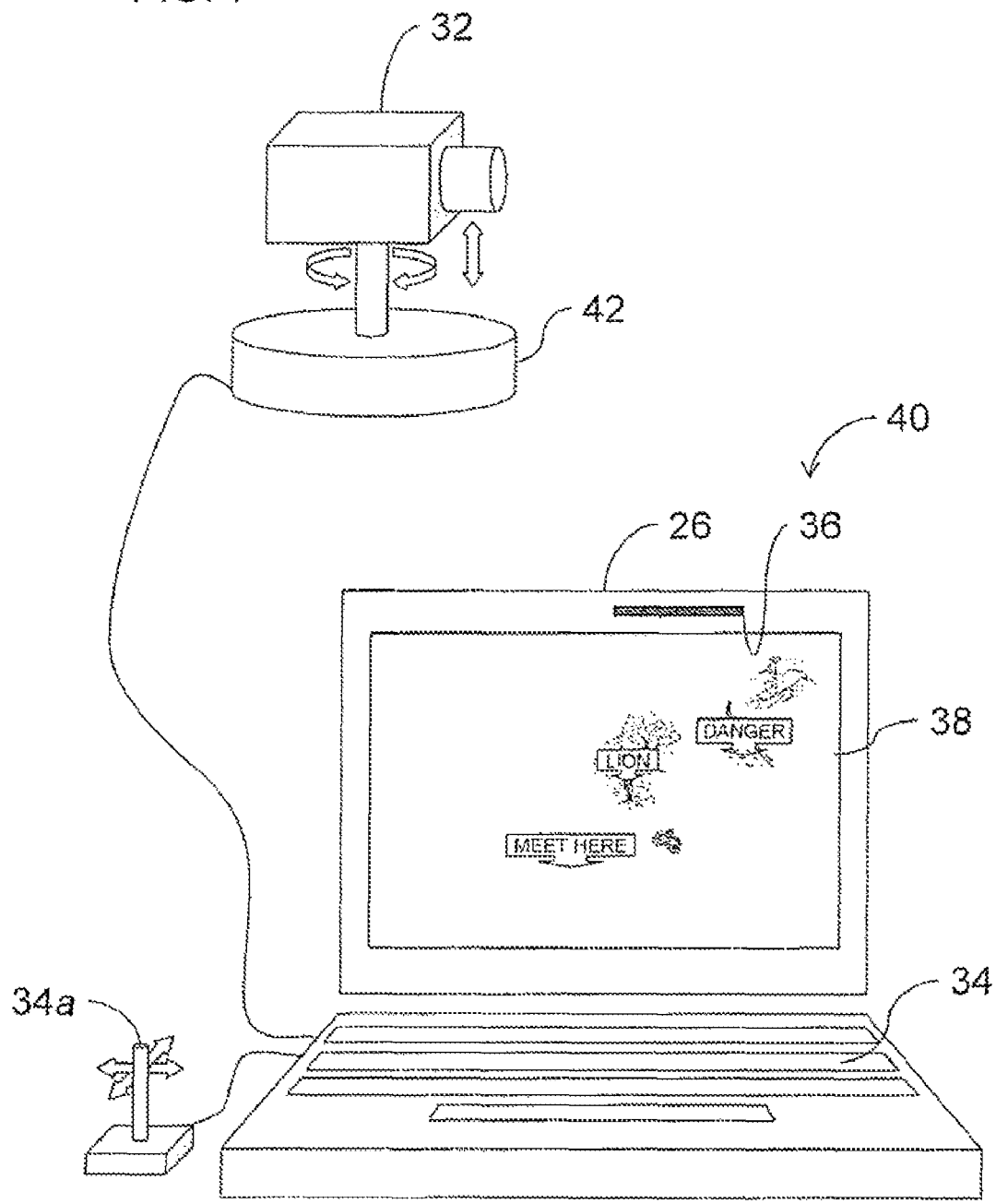
FIG. 7 is a schematic perspective view of a possible of implementation of the mobile unit of FIG. 6.

Turning now to FIGS. 6 and 7, these show an alternative implementation of a user unit in which the user views the region of interest indirectly on a (non-transparent) display screen. In this case, image sensor 32 generates video images for display on a display device 38 such that the position (i.e., location and orientation) of the image sensor defines the current perspective view. In this case, the display device 38 need not be physically aligned with the objects viewed. The remaining components of the user unit are essentially similar to those of the user unit of FIG. 3, and are labeled similarly. These include computer 26, with its at least one processor 28 and data storage device 30, user input interface 34 and wireless networking arrangement 36. In contrast to the implementation described earlier, computer 26 here generates the location-related information as a graphic overlay for mixing with the live video image for display on a single display device 38.

In the non-limiting exemplary implementation of FIG. 7, computer 26, display device 38, wireless networking arrangement 36 and user interface 34 are all implemented using a standard notebook computer 40. Image sensor 32 is implemented as a video camera on a motorized mount 42 which is remotely controlled from the user input interface such as via joystick 34*a*. Although shown here connected by wired connections it should be noted that the image sensor 32 of this embodiment may in fact be located far from the control location, for example, as part of a remotely controlled vehicle or robot.

Figure 8:
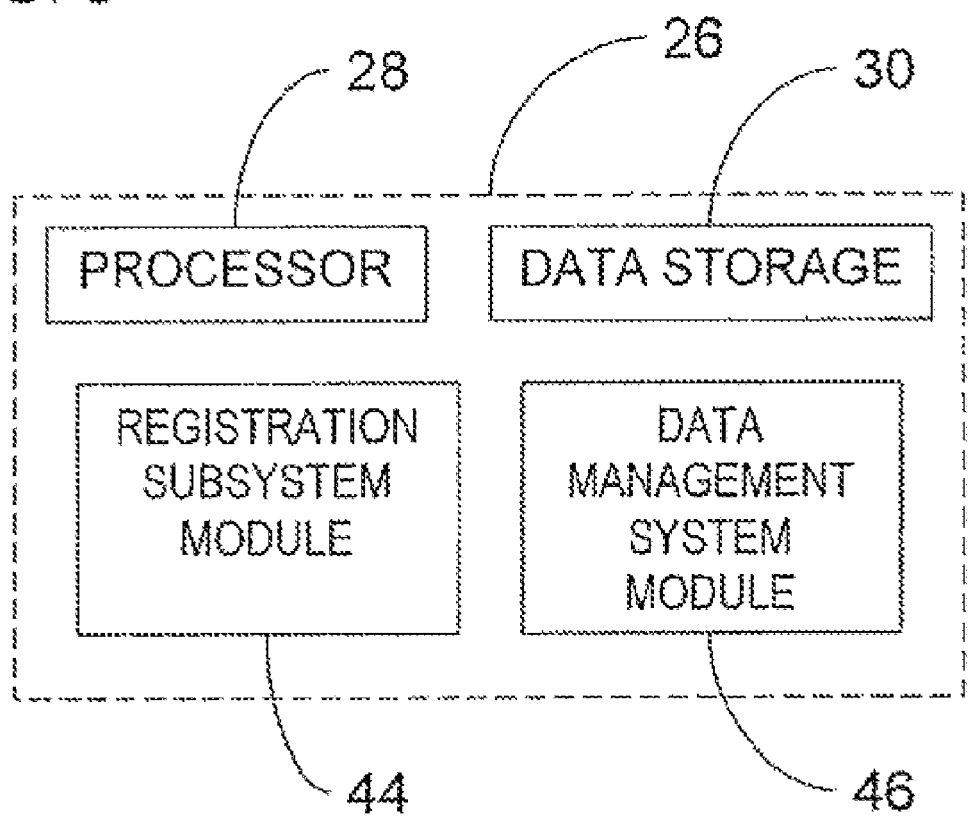
FIG. 8 is a schematic block diagram of a computer component for use in the mobile units of FIG. 3 or 6.

Referring briefly to FIG. 8, it should be noted that, both in the implementation of FIGS. 3 and 4 and in that of FIGS. 6 and 7, the various processing and data manipulation functions required for operation of the system are preferably implemented as software modules running on computer 26. Thus, in the example of FIG. 8, computer 26 with its processor(s) 28 and data storage device(s) 30 is shown to include a registration subsystem module 44 and a data management system module 46. As will be clear to one ordinarily skilled in the art, modules 44 and 46, and any other modules required for implementation of the system, may be implemented using any desired combination of software and hardware ranging from general purpose hardware with software running under a suitable operating system through to dedicated hardware configured to perform similar functions.

Figure 9:
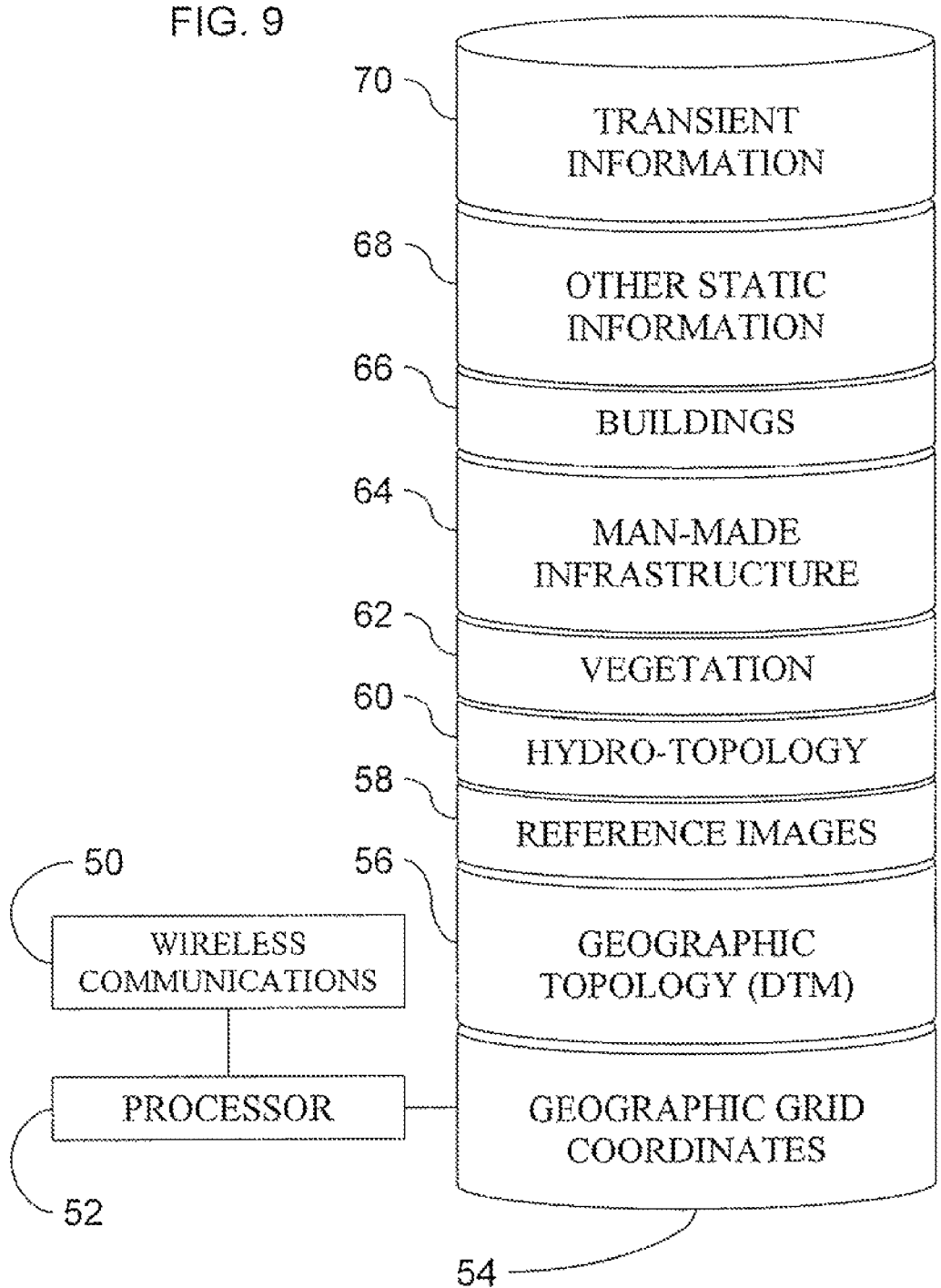
FIG. 9 is a schematic representation of a remote geographic information database system for use with certain preferred implementations of the present invention.

Turning now to FIG. 9, it will be noted that the user unit described thus far may be used in certain cases as a networked group to provide a fully operational system where each user unit carries its shared location reference in local data storage. Where the quantity of reference data becomes significantly larger, and particularly for wide-area use of mobile units, the user units are preferably networked with one or more remote database which stores a plurality of location reference images which are selectively transferred to the user unit as needed. According to a particularly preferred additional aspect of the present invention, believed to be patentable in its own right, the remote database is a standardized geographic database including a plurality of aerial, satellite or orthophoto images of a region tied to an underlying geostationary coordinate grid, thereby facilitating registration by image correlation over extended regions without necessitating preparation of a dedicated database infrastructure. FIG. 9 shows an illustrative example of such a database.

Specifically, the database unit of FIG. 9 includes a wireless communications link 50 and a processor 52 for handling data management and communications. The database itself is a layered data structure based on a geographical grid of geostationary coordinates 54 to which each subsequent layer is tied. Associated with the coordinate system is a digital terrain map (DTM) 56 and overlapping reference images 58 which are typically a set of orthophotos. Other information layers may include: hydro-topology 60 such as rivers, lakes, underground aquifiers and the like; vegetation 62 such as forests or even individual trees or shrubs; man-made infrastructure 64 such as roads, electricity cables, water, gas and oil pipelines etc.; buildings 66; other static information 68 such as graves, monuments and other real or virtual landmarks; and in some cases transient information 70.

It will be appreciated that the use of image correlation with respect to orthophotos or other near-orthogonal images (aerial or satellite) is particularly suited to significantly downward-directed viewing direction. Examples of applications employing such downward viewing directions include fixed user units at look-out points on hills or mountains, look-out platforms on high buildings, and airborne applications such as helicopter tours. In cases where the viewing direction is not significantly downward-directed, successful registration to a geographic grid via an orthophoto may still be achieved, particularly when using a two-stage mapping via an arbitrarily intermediate view taken at an intermediate view angle. This option will be addressed further below with reference to FIG. 13.

Depending upon the source of the database information and the authority of the users to update the information, the database information may be made available on a read/write basis or as read-only. In the former case, the network of users becomes part of the mechanism for real-time update of information stored in the database. In the latter case, user-designated points of interest to be shared with other users may either be stored locally in each user unit or may be stored at a system-dedicated additional base station with a secondary database containing the location-related data entries generated by all users.

Figure 10:
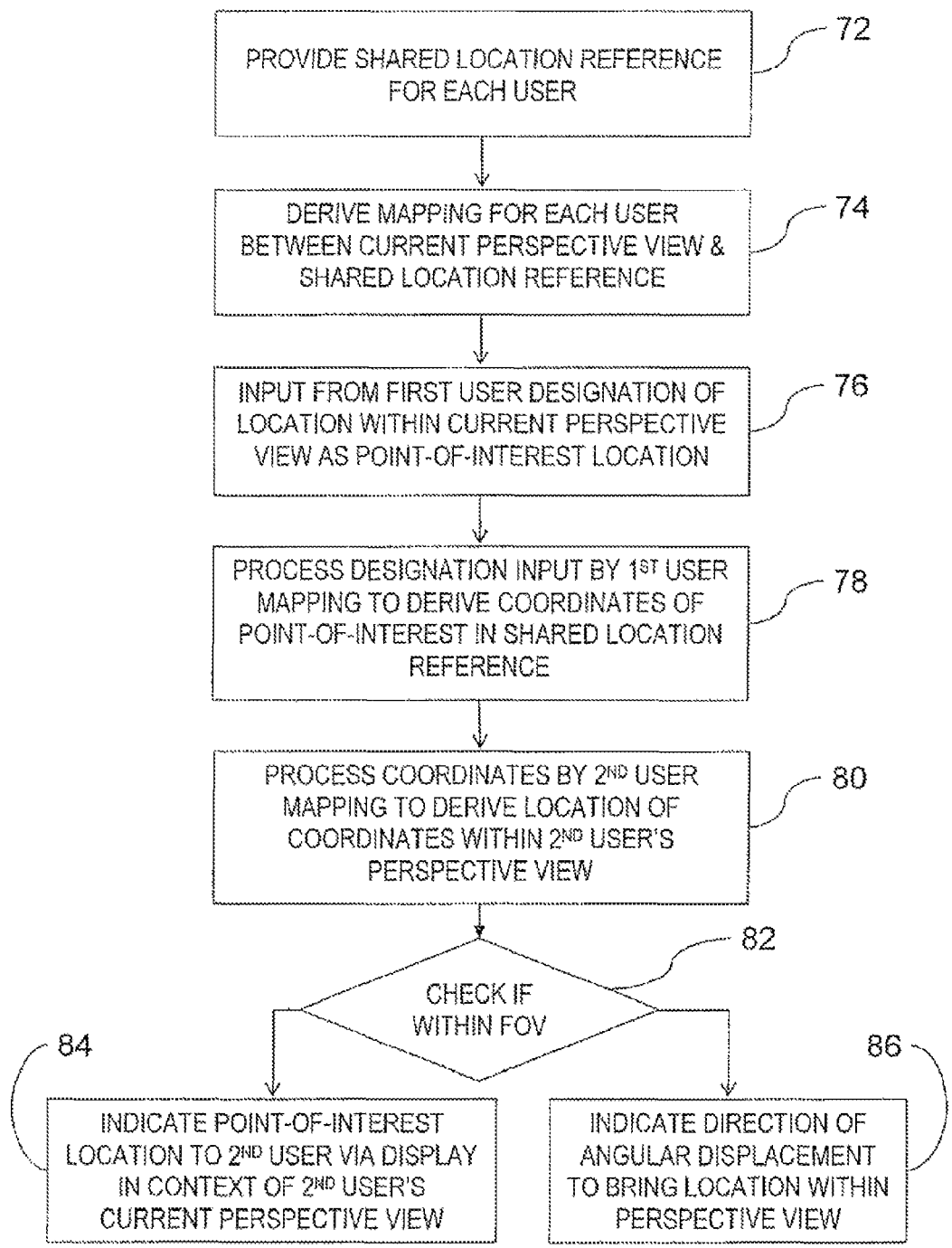
FIG. 10 is a flow diagram of a method according to the present invention for dynamic distribution of location-related information between users with different perspective views.
Figure 11:
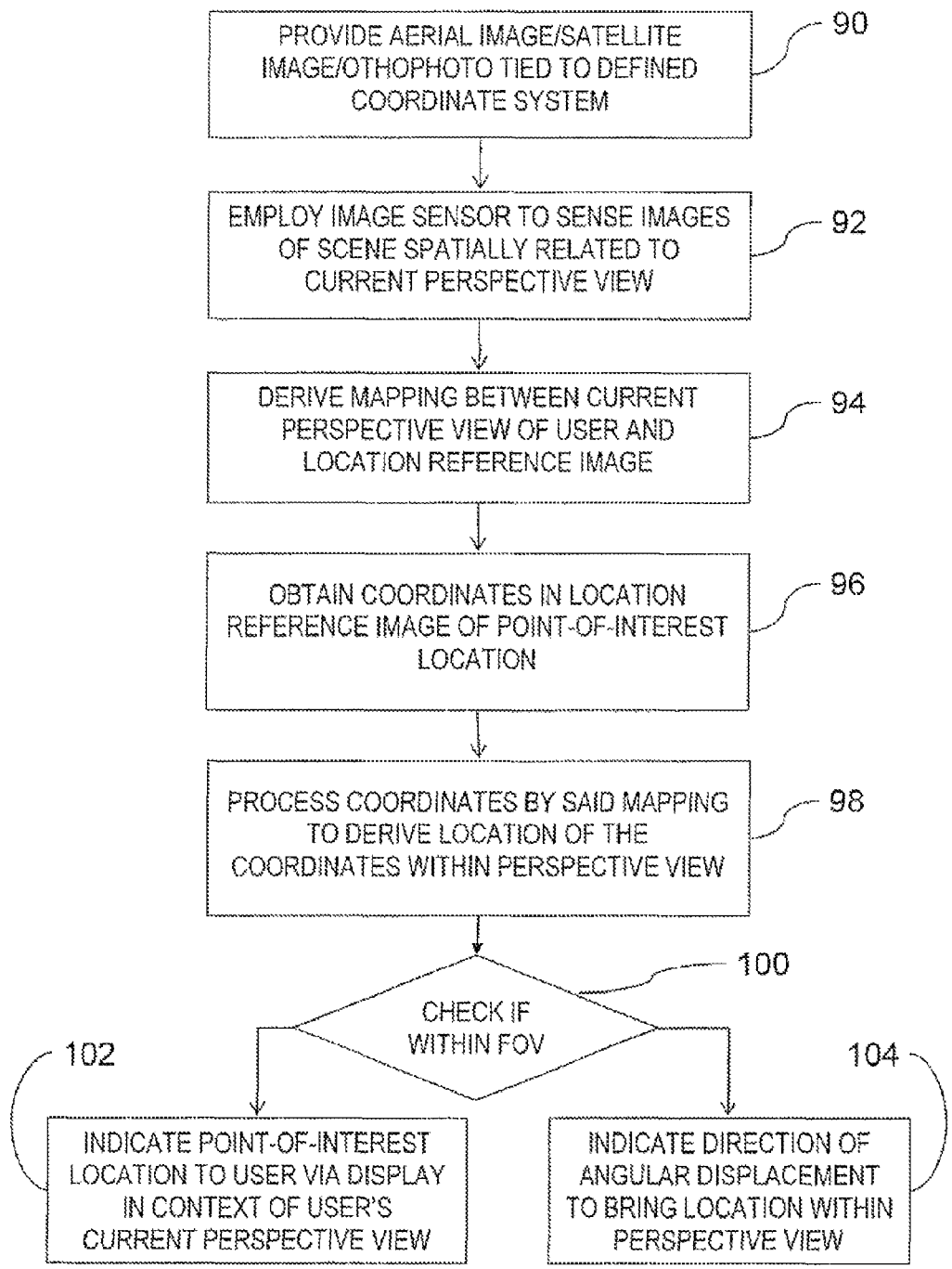
FIG. 11 is a flow diagram of a geographic-database-based method according to the present invention for displaying location-related information to a user having a perspective view of a region of interest.

Turning now to the operation of the system (according to both of the aforementioned user unit embodiments), and the corresponding methods of the present invention, these are illustrated in FIGS. 10 and 11 as follows. FIG. 10 illustrates the system operation and method according to the first aspect of the invention relating to dynamic distribution of information, while FIG. 11 illustrates the system operation and method according to the second aspect of the invention relating to geographic-database-based information systems.

Addressing first FIG. 10, each user unit is first provided with a shared location reference for the region of interest (step 72), the shared location reference having a defined coordinate system, and a mapping is derived between the current perspective view of the user and the shared location reference (step 74). In the preferred implementations as described above, as the user units move around and/or are turned in different directions, images retrieved from image sensor 32 are correlated to the location reference (reference images and/or three-dimensional topographic information) to determine a mapping between the current perspective view of the user and the location reference. Optionally, the correlation process can be made more efficient by use of other sources of information for an initial position and direction estimate. For example, initial rough position and direction information may be derived from an integrated GPS sensor and/or compass (not shown). Additionally, or alternatively, acceleration and rotation sensors (not shown) may provide short-term inertial navigation information to predict an estimate of a current viewing direction based upon motion since the previous successful image registration viewing direction. In either of these cases, the GPS, compass and inertial sensors may be integrated into the user unit itself or may be carried separately by the user or housed in a vehicle carrying the user unit. In the latter case, user unit pose relative to the vehicle may also be measured by an arrangement of mechanical, optical or other sensors.

The result of steps 72 and 74 is that each user unit maintains a mapping which at any time allows bi-directional transformation between a reference set of coordinates (e.g., pixels within a common reference image) and position in the user's current field of view. This facilitates dynamic distribution of information between users as follows. At step 76, a designation input is input from a first user thereby designating a location within the first user's current perspective view as a point-of-interest location. In the example of the mobile user unit of FIG. 4, this may be done by directing the user device so that the cross-hair of the field of view overlies the point of interest (e.g., the lion 20 shown in view V1 of FIG. 2A), and depressing button 34. In the example of the user unit of FIG. 7, this may either be done similarly by aligning a cross-hair on the optical axis of the camera with the point of interest or by moving a selection cursor within the image while the camera is stationary. Once the point-of-interest has been designated in the current perspective view, the designation input is processed by use of the first user's mapping to derive coordinates in the shared location reference corresponding to the point-of-interest location (step 78). At this stage, the new location-related information entry may be shared directly by wireless communication with the other user units or may be uploaded to a remote database from which it is made available to other user units as appropriate.

For display to another user, the coordinates are then processed by use of a second user's mapping to derive a location of the coordinates within the second user's perspective view (step 80) and the point-of-interest location is indicated to the second user via a display in the context of the second user's current perspective view (step 84), as illustrated in FIGS. 2B and 7. Optionally, the system may check at step 82 whether the point of interest is presently within the second user's current perspective view and, if not, may provide a directional cue on the display indicating a direction, and optionally also magnitude, of angular displacement of the second user's perspective view required to bring the location within the perspective view (step 86). An example of such a directional cue is illustrated in FIG. 2C.

It should be noted that, besides allowing precise inter-platform communication, the conversion of designated point-of-interest into coordinates relative to a shared reference image provides for highly concise (low bandwidth) communication formats. Thus, according to one particularly preferred implementation, a location-related information entry generated by one of the user units includes coordinates of the designated location within a selected reference image and an index identifying the corresponding one of the reference images. According to a further options the location may be fully specifies by geostationary (North-South) coordinates. Thus, the entire location information for the new entry may be transferred to a central database and/or other user unit by transmitting three, or even two, numbers. Optionally, additional text such as the examples "lion", "meet here" or "danger" may be appended to the data entry. The data entry may also be classified as to that layer of information it belongs to, and typically also includes information as to who input the information and at what time. The sum total of all such information typically does not amount to more than a brief text string which represents extremely low data volume by any modern communication standards, and allows large quantities of information to be transferred between many user units in real time without burdening the communications infrastructure.

Turning now to the second aspect of the present invention as illustrated in FIG. 11, this illustrates a method for displaying location-related information to a user having a current perspective view of a region of interest. In this case, the method starts by providing access to at least one location reference image for the region of interest, wherein the location reference image is tied to a defined coordinate system and is selected from the group made up of: an aerial image; a satellite image; and an orthophoto (step 90). An image sensor is then employed to sense images of a scene spatially related to the current perspective view of the user (step 92) and a registration mapping is determined between the images from the image sensor and the location reference image, thereby deriving a mapping between the current perspective view of the user and the location reference image (step 94). Points of interest are then displayed as follows. Coordinates are obtained, either from internal data storage or from a remote source, corresponding to a point-of-interest location in the location reference image (step 96) and these coordinates are processed by use of the aforementioned mapping to derive a location of the coordinates within the perspective view (step 98). The point-of-interest location is then indicated to the user via a display in the context of the user's current perspective view (step 102). Here too, the system optionally checks at step 100 whether the point of interest is presently within the second user's current perspective view and, if not, may provide a directional cue on the display indicating a direction and/or magnitude of angular displacement of the perspective view required to bring the location within the perspective view (step 104).

Figure 12:
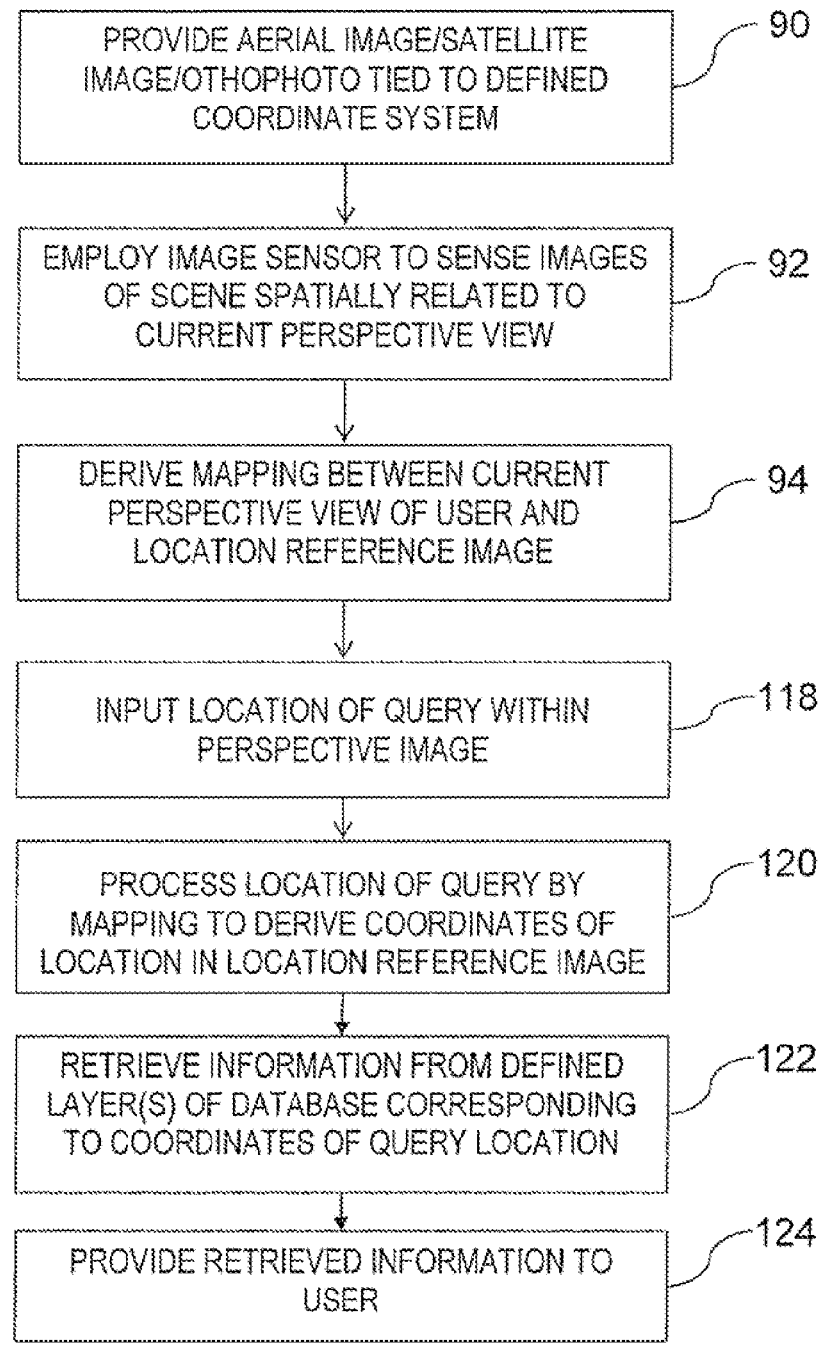
FIG. 12 is a flow diagram similar to FIG. 11 illustrating an alternative, or supplementary, mode of operation based on user-initiated queries.

Although described above as automatically indicating locations and/or information about points of interest in the field of view, it should be noted that the system may alternatively, or additionally, provide various information to the user on the basis of user-designation of a position within the current perspective view. This option is illustrated in FIG. 12. The operations, and corresponding method, start with steps 90, 92 and 94 as described above with reference to FIG. 11. Then, at step 118, the user selects or points at a building or other feature visible in the current perspective view, for example by dwelling over the feature with a user-controlled cursor. The system then employs the mapping of step 94 to derive the corresponding location within the reference location image (step 120) and retrieves corresponding desired information from the geographic database (step 122) to be displayed or otherwise provided to the user (step 124). Thus, the user my point at a building and be provided any desired level of information about that building which is available from the database, as defined by the intended application and user options. Thus, for tourist applications, the information may include the age of the building, its function and any other points of architectural or historical interest associated with the building. Other possible applications could include city tax inspectors who could be provided the name, address and current balance of city tax accounts of the home-owner resident in the selected building.

Parenthetically, it is noted that the "location reference image" referred to herein may serve as the "shared reference image" according to the first aspect of the present invention described above. Since the second aspect of the invention is believed to be of value even when implemented for a single user operating alone, the reference image is not necessarily "shared" in the sense of the first aspect of the invention.

It should also be noted that the image sensor is employed to sense images of a scene is described as being "spatially related" to the current perspective view of the user. Since the sensed images are for registration purposes to derive the current perspective view of the user, it is not essential for the sensed images to be taken in the same direction as the perspective view of the user so long as the spatial relationship between the sensed images and the viewing direction of the user is known.

Figure 13:
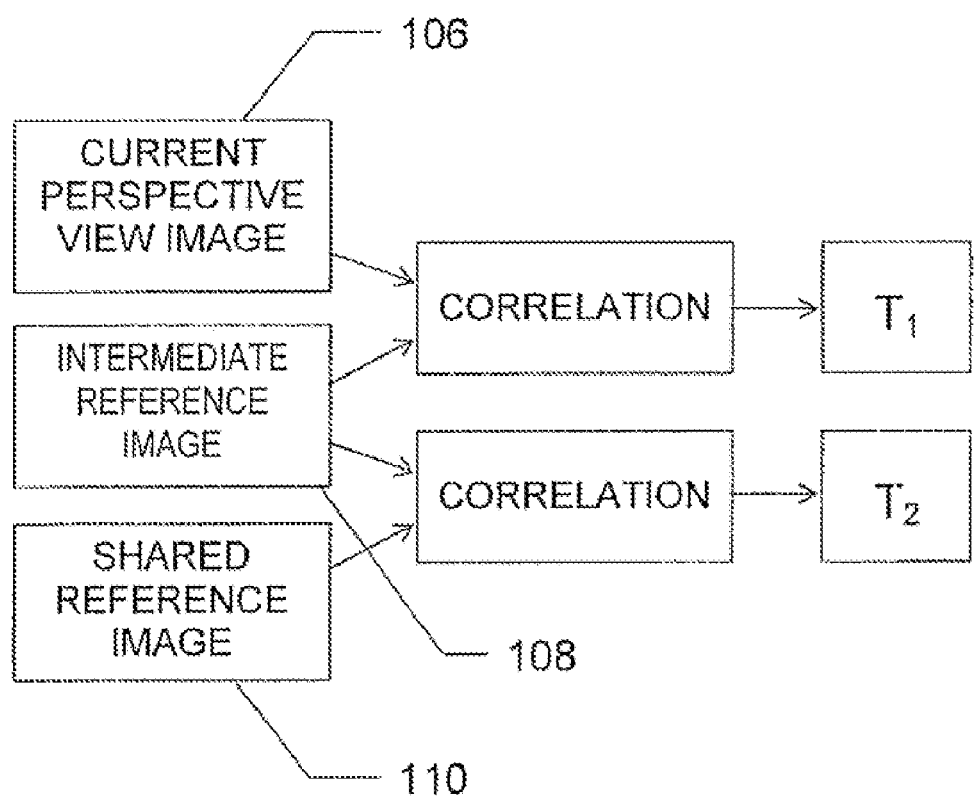
FIG. 13 is a schematic block diagram illustrating a two-stage image correlation procedure employed by certain implementations of the present invention.

Turning, finally, to FIG. 13, it should be noted that the various transformation mappings referred to in the description and claims need not be single step transformations. By way of example, it may be preferable in certain cases to perform image-to-image correlation between the current perspective view 106 and an intermediate reference image 108 to generate a first mapping transformation $T_1$, and then again between the intermediate reference image 108 and the location reference image 110 to generate a second mapping transformation $T_2$. One example where such two-stage processing is helpful is where the current perspective view as sampled by the image sensor has too small a field of view to ensure reliable registration with a reference image such as an orthophoto. In this case, a wide field-of-view image is typically sampled in advance, either by temporarily removing telescopic magnification from the image sensor optics or by employing a reference image sampled from another source. A further case where two-stage processing is of value is where extreme differences exist in the direction of viewing such as during processing of a near-horizontal view win an orthophoto. In such a case, sampling of a temporary reference image of the region at an intermediate angle of between about 30° and 60° downwards elevation may provide sufficient common information between the intermediate reference image and both the current perspective view and the orthophoto to allow successful registration. In both cases, the intermediate reference image 108 is preferably a "frozen" image, such that the second transformation mapping $T_2$ does not vary until a new reference image 108 is required. In many cases this greatly simplifies the numerical processing since the real-time correlation calculations are performed primarily between two relatively similar views.

Parenthetically, it should be noted that the point-of-interest location may designate an object which is either indiscernible or does not appear at all in one or both of the intermediate reference image and the location reference image. For example, the lion of FIGS. 1, 2A and 2B typically does not exist in either of the reference images. So long as sufficient content remains similar between the images to allow effective correlation of the images, this does not interfere with implementation of the method of the present invention.

It should also be noted that calculation of the transformation mappings, at least $T_1$, for each user unit is typically a continuously updating process which continues to update while a point of interest is displayed. As a result, the point of interest appears to "track" with changes in the current perspective view so that it remains currently located with the user's view independent of the user's motion.

It will be appreciated that the above descriptions are intended only to serve as examples, and that many other embodiments are possible within the scope of the present invention as defined in the appended claims.

What is claimed is:

1. An information system for dynamic distribution of location-related information between users with different perspective views, the system comprising a plurality of user units, each user unit including:
   (a) a viewing arrangement defining a viewing direction of a current perspective view;
   (b) an image sensor deployed in fixed spatial relation to said viewing arrangement;
   (c) a registration subsystem for deriving a mapping between the current perspective view and a shared location reference;
   (d) a data management system including a processor and a storage device, said data management system storing location-related information associated with coordinates within said shared location reference and employing said mapping to transform between said coordinates within said shared location reference and a corresponding viewed location within the current perspective view; and
   (e) a wireless communication arrangement for sharing between said plurality of user units location-related information and corresponding coordinates,
wherein at least a first of said user units further includes a user input interface for designating a viewed location within the current perspective view a viewed location for association with location-related information, thereby generating a new location-related information entry for sharing with others of said: plurality of user units,
and wherein at least a second of said user units further includes a display device associated with said viewing arrangement for displaying location-related information correctly positioned in the context of the current perspective view,
and wherein said shared location reference includes at least one location reference image, said registration subsystem being configured to correlate images from said image sensor with said location reference image to determine a registration mapping between images from said image sensor and said, shared location reference, said correlating including correlating said image with an intermediate reference image so as to generate a first mapping transformation and correlating said intermediate reference image with said location reference image so as to generate a second mapping transformation, said registration mapping being employed to derive coordinates of the designated location within said shared location reference for transmission from said first user via said wireless communication arrangement.

2. The system of claim 1, wherein each of said plurality of user units includes said display device associated with said viewing arrangement.

3. The system of claim 2, wherein each of said plurality of user units includes said user input interface such that a user of each of said user units can designate a viewed location for display with location-related information in the current perspective view of users of all others of said user units.

4. The system of claim 2, wherein said viewing arrangement displays video images from said image sensor on said display device, such that a position of said image sensor defines said current perspective view.

5. The system of claim 2, wherein said display device is a see-through display device, said viewing arrangement allowing direct viewing of said current perspective view through said display device by a user.

6. The system of claim 5, wherein said viewing arrangement further includes an optical arrangement for magnifying said current perspective view as directly viewed by the user.

7. The system of claim 1, wherein said at least one location reference image is one of the group made up of: an aerial image; a satellite image; and an orthophoto.

8. The system of claim 7, wherein said location reference further includes at least one of an elevation map and a digital surface model.

9. The system of claim 1, wherein said at least one location reference image includes a plurality of reference images, and wherein said first of said user units generates a new location-related information entry including coordinates of the designated location within one of said reference images and an index identifying the corresponding one of said reference images.

10. The system of claim 1, wherein each of said user units is a mobile unit.

11. A method for dynamic distribution of location-related information between two users viewing a common region of interest from different viewing directions, each user having a current perspective view of the region of interest, the method comprising:
   (a) for each user:
      (i) providing a shared location reference for the region of interest including at least one location reference image, the shared location reference having a defined coordinate system,
      (ii) obtaining an image in fixed spatial relation to the current perspective view of the user, and
      (iii) correlating said image with said, location reference image to determine a registration mapping between, said image and said shared location reference, thereby deriving a mapping between the current perspective view of the user and said shared location reference;
   (b) inputting from the first user a designation input designating within the first user's current perspective view a viewed location as a point-of-interest location;
   (c) processing the designation input, by use of the first user's mapping, to derive coordinates in the shared location reference corresponding to the point-of-interest location;
   (d) processing the coordinates, by use of the second user's mapping, to derive a location of the coordinates within the second user's perspective view; and
   (e) indicating the point-of-interest location to the second user via a display in the context of the second user's current perspective view;
wherein said correlating includes correlating said image with an intermediate reference image so as to generate a first mapping transformation and correlating said intermediate reference image with said location reference image so as to generate a second mapping transformation.

12. The method of claim 11, wherein said processing the designation input is performed using a processing system at a first location, and wherein said processing the coordinates is performed using a processing system at a second location, the method further comprising transmitting the coordinates from the first location to a second location.

13. The method of claim 12, wherein said shared location reference includes a plurality of location reference images, and wherein said transmitting includes transmitting an identifier for identifying one of said location reference images within which said coordinates lie.

14. The method of claim 12, wherein said transmitting is performed wirelessly.

15. The method of claim 12, wherein said transmitting includes transmitting location-related information associated with the point-of-interest location.

16. The method of claim 11, wherein said coordinate system is a geographical coordinate system.

17. The method of claim 11, wherein said indicating the point-of-interest location to the second user is performed by generating a visible indication on a transparent display, positioned in alignment with the second user's current perspective view as viewed directly by the second user.

18. The method of claim 11, wherein said step of indicating the point-of-interest location to the second user is performed by generating a visible indication on a display screen in the context of an image of the second user's current perspective view as derived from an image sensor.

19. The method of claim 11, further comprising, in a case where said location of the coordinates lies outside the second user's perspective view, indicating on said display a direction of angular displacement of the second user's perspective view required to bring said location within the perspective view.

* * * * *